United States Patent [19]
Albrecht et al.

[11] 3,714,538
[45] Jan. 30, 1973

[54] VELOCIMETER

[75] Inventors: George O. Albrecht; Thomas E. Nead, both of Loveland, Ohio

[73] Assignee: Cincinnati Milacron Inc., Cincinnati, Ohio

[22] Filed: Sept. 13, 1971

[21] Appl. No.: 179,901

[52] U.S. Cl. ...................... 321/1, 317/5, 321/6, 324/160, 324/169, 340/263
[51] Int. Cl. .................................................. H02m
[58] Field of Search ............... 317/5, 6, 19; 321/6, 1; 324/160, 164; 340/263, 271

[56] References Cited

UNITED STATES PATENTS

| | | | |
|---|---|---|---|
| 3,276,256 | 10/1966 | Rudasill et al. | 340/271 X |
| 3,480,859 | 11/1969 | Fichter | 317/5 X |
| 2,979,623 | 4/1961 | Fowell | 324/160 X |
| 3,525,017 | 8/1970 | Rosenberg et al. | 317/5 |
| 3,527,986 | 9/1970 | Darrow | 317/5 |
| 3,543,110 | 11/1970 | Ruof | 317/5 X |
| 3,560,854 | 2/1971 | Moss et al. | 317/5 X |
| 3,622,208 | 11/1971 | Krugler, Jr. | 317/5 X |
| 3,640,586 | 2/1972 | Kohler | 317/5 X |
| 3,657,601 | 4/1972 | Darrow | 317/5 |

Primary Examiner—William M. Shoop, Jr.
Attorney—Howard T. Keiser et al.

[57] ABSTRACT

A velocimeter being readily adaptable for measuring the magnitude and direction of velocity of a moving element. A transducer is responsive to the moving element and produces an output signal having frequency variations proportional to the transducer velocity. A circuit is provided for measuring the variations in frequency and producing a DC output signal as a function thereof.

2 Claims, 3 Drawing Figures

INVENTORS
GEORGE O. ALBRECHT
THOMAS E. NEAD
BY
*Howard S. Kiser*
*C. Richard Eby*
ATTORNEYS

VELOCIMETER

BACKGROUND OF THE INVENTION

The invention relates generally to the area of velocity measuring devices; and specifically, the invention discloses a velocimeter for quickly and accurately measuring the speed of a moving element.

Typically, when one desires to measure the velocity of a moving element, a tachometer generator is used in conjunction with the element itself or the driving mechanism therefor. Aside from their relative expense, there are several inherent disadvantages to tachometer generators. First, it is necessary to have a rotary driving force. This must be derived from the moving element itself or its driving mechanism. Consequently, on devices only having linear motors, tachometer generators are highly impractical. They must be coupled into the system by a rack and pinion or some other relatively unreliable and expensive apparatus. In addition, because one must use additional couplings and gearing to apply a tachometer generator, the cost is increased; and the reliability is decreased;. Applicant discloses a velocimeter which is free of the above disadvantages and which may be applied to any moving element regardless of the nature of its driving force.

SUMMARY OF THE INVENTION

An apparatus for measuring velocity of a moving element wherein a transducer is coupled to the moving element and generates a periodic output signal having a frequency that changes as a function of velocity of the moving element. A frequency detecting circuit is responsive to the output signal for detecting changes in the frequency and providing a control signal as a function thereof. Finally, a converter circuit is responsive to the control signal and produces a DC output signal having a polarity and magnitude representing the direction and magnitude of the velocity of the moving element.

DESCRIPTION OF THE PREFERRED EMBODIMENT

Figure 1:
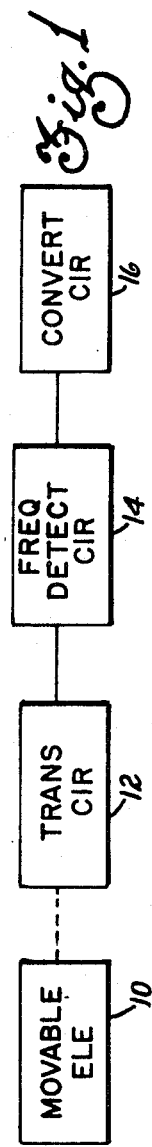
FIG. 1 is a general block diagram of the invention.

FIG. 1 is a general block diagram illustrating the invention. A moving element 10 is mechanically coupled to a transducer circuit 12 comprised of a transducer element and associated electronic circuitry. The relationship of the moving element to connecting mechanical apparatus is not important. Whether or not the transducer element is coupled to the moving element itself or to a corresponding driving mechanism has no bearing on the disclosed invention. The only limitation is that the transducer circuit 12 must generate a periodic signal having a period which changes as a function of the velocity of the moving element. There are many position measuring transformers commercially available which have such a characteristic. In addition, such transformers are available for application to moving elements having linear or rotary motion. A frequency detecting circuit 14 is responsive to the signal from the transducer for measuring changes in the signal frequency. The circuit 14 produces an output signal as a function of the frequency variations from the transducer circuit 12. A converter circuit 16 is responsive to the output signal from the frequency detecting circuit for producing a DC output signal having a polarity and magnitude proportional to the velocity of the moving element.

Figure 2:
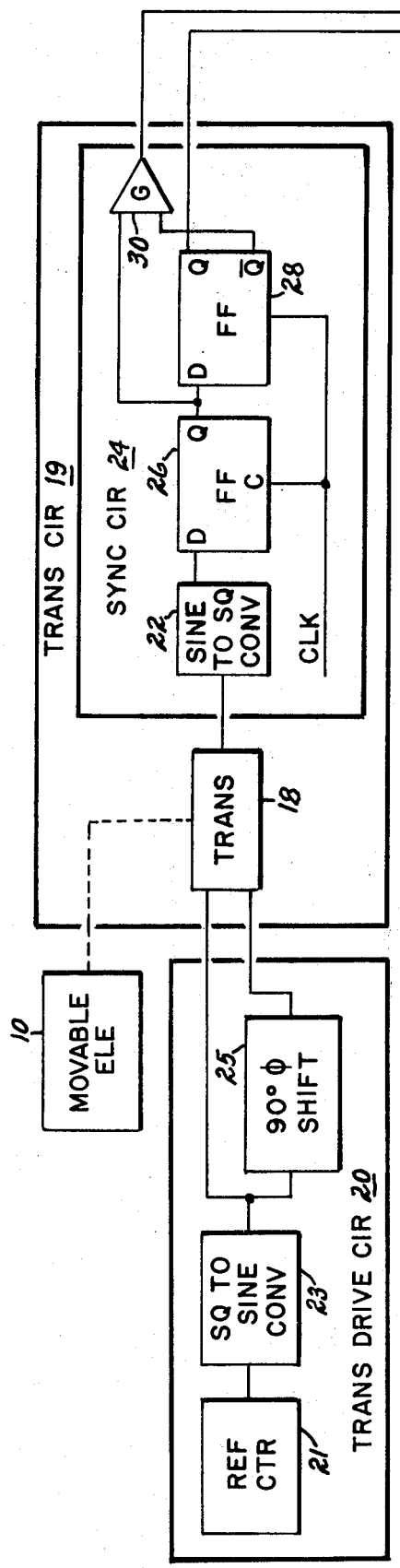
FIG. 2 illustrates an analogue embodiment of the invention.
Figure 2:
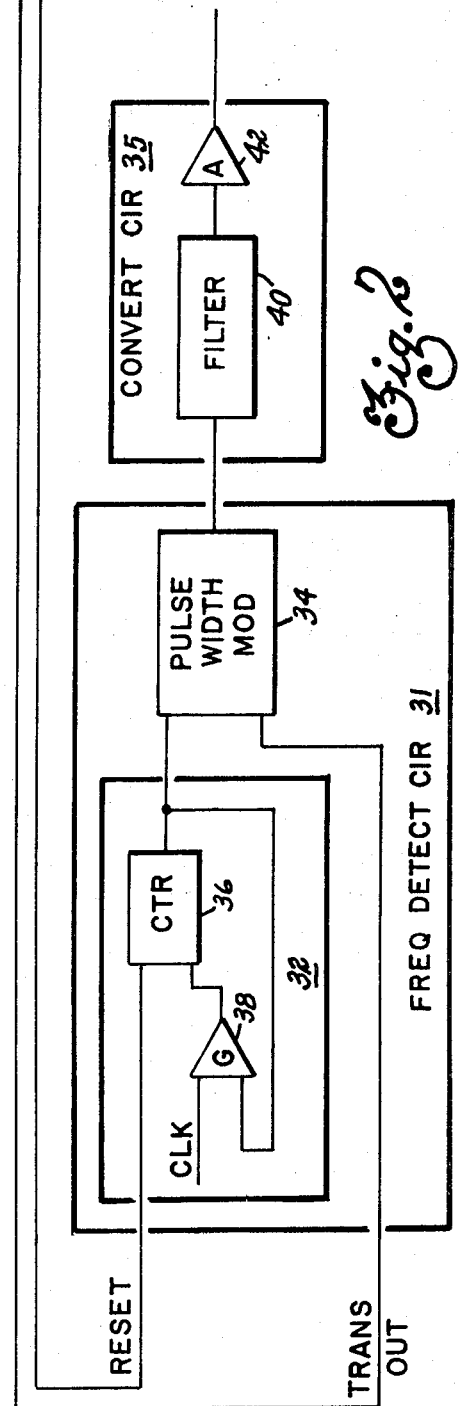

FIG. 2 illustrates an analogue circuit embodiment of the invention. The movable element 10 is mechanically coupled to a transducer 18 in the transducer circuit 19. The transducer 18 may be any one of commercially available transformers having an output coil which is free to move with respect to multiple phase input coils. Typically, the input coils will be displaced 90 mechanical degrees from each other. Consequently, an input will comprise two electric signals, one being 90 electrical degrees out of phase with respect to the other. The output coil is typically in mechanical communication with the movable element. As mentioned earlier, this transformer may be linear or rotary in construction. The transducer drive circuit 20 produces two constant amplitude input signals which are 90° out of phase. In a manner well-known to those who are skilled in the art, one of the reference signals may be produced from a square to sine converter 23 being driven by a reference counter 21. The other signal may be produced from a 90° phase shift circuit 25 having an input connected to the square to sine converter 23. The transducer 18 produces a cyclic output signal having a phase relation to the input signals which is a function of the position of the output winding relative to the input windings. Of course, the position of the output coil is a function of the position of the moving element. A further characteristic of the transducer is that the frequency of the output signal changes with respect to the frequency of the input signals as a function of the velocity of the output coil. As the velocity of the output coil increases in one direction, the period of the output signal will decrease thereby increasing its frequency. Likewise, if the velocity of the output winding increases in the other direction, the period of the output signal will increase thereby decreasing its frequency. It is this change in frequency applicant utilizes in this invention.

The sine to square converter 22 located in the synchronizing circuit 24 is a well-known circuit for converting the sine wave output signal from the transducer 18 into a square wave having identical frequency characteristics. Next, the other elements in the synchronizing circuit 24 produce a reset pulse at the beginning of each output signal period. There are many possible circuits for performing this function, and applicants chose to use two flip flops 26 and 28 and a gate 30. An output from the flip flop 28 represents a synchronized transducer output signal, and the reset signal is obtained from an output of the gating network 30. A frequency detecting circuit 31 is responsive to the output signals from the transducer circuit 19. The circuit 31 is comprised of a monostable multivibrator 32 and a pulse width modulator 34. On command from the reset signal, the multivibrator 32 produces an output pulse having a time duration equal to one-half of the period of the transducer output signal at zero velocity. In this embodiment, applicants illustrate the multivibrator to be comprised of a counter 36 and gate 38. In response to the reset pulse, the output of the counter 36 is switched to a level allowing clock pulses to pass through the gate 38 and energize the counter 36. When the counter counts to the desired magnitude representing one-half of a period of the transducer output signal, the counter output toggles thereby inhibiting the flow of clock pulses through the gate 38 until the next reset pulse. The counter output and the synchronized transducer signal are inputs to a pulse width modulator 34. The pulse width modulator produces a square wave output having alternate positive and negative portions. The positive portion occurs during the counting period of the counter 36 and therefore never varies. However, the negative portion will vary as the frequency of the synchronized transducer output signal. With a zero velocity, the negative portion will be equal to the positive portion. However, a velocity will cause the negative portion to increase or decrease, depending upon the velocity direction, with respect to the positive portion. The output from the pulse width modulator 34 is an input to a converter circuit 35 comprised of a filter network 40 and amplifier 42. The filter network 40 is responsive to the square wave signal from the pulse width modulator for producing a DC output signal having a polarity and magnitude representing the velocity of the movable element. In other words, if the negative portion of the input signal is greater than the constant positive portion an average negative DC output signal will be produced by the filter. The amplifier 42 operates to amplify the filter output and produce a suitable signal level.

There are several points of interest regarding the first embodiment. The transducer which was described could take the form of a position measuring transformer. These transformers are in wide use throughout industry and are used most often to provide an input for a position feedback loop. Consequently, with the invention disclosed, a position measuring transformer may simultaneously be used in a velocity feedback loop.

A popular positioning servomechanism loop in use today is one having a relatively low loop gain. Those familiar with the characteristics of the type of transducer discussed herein will recognize the fact that the magnitude of the range of frequency variations with velocity is relatively small. Typically, the frequency will change 60 hertz for every one foot per second of velocity change. Consequently, it is necessary that the output amplifier 42 have a relatively high gain. Therefore, the signal to noise ratio of the first embodiment may be too low for some applications. For example, when one is interfacing the disclosed apparatus into a low gain servomechanism loop, the noise and component drift errors in the velocity loop will appear as positioning errors. Therefore, applicants disclose a second embodiment which replaces the analogue components in the first embodiment with digital components.

Figure 3:
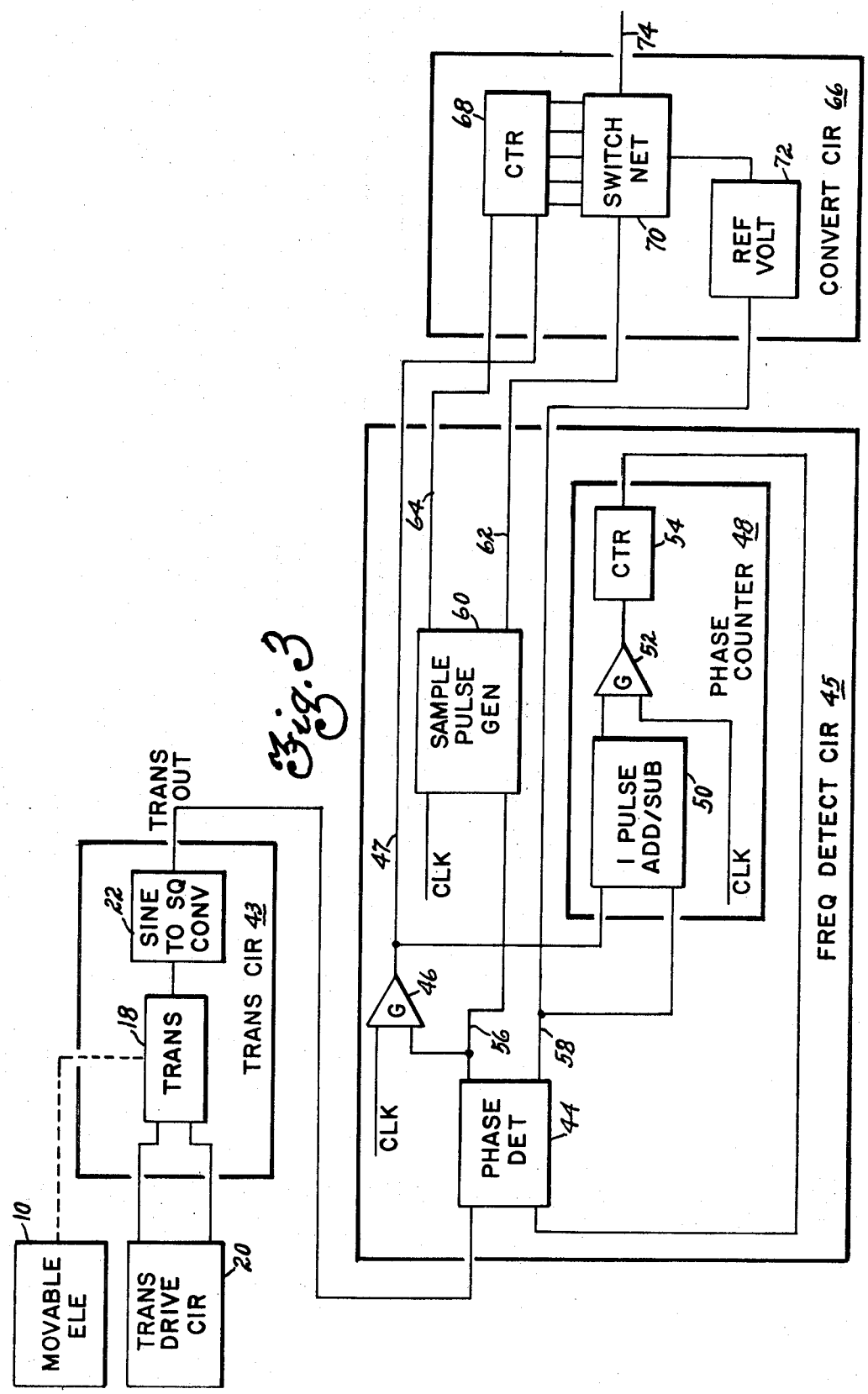
FIG. 3 illustrates a digital embodiment of the invention.

The second embodiment illustrated in FIG. 3 is free of the disadvantages caused by any noise occuring in the first circuit disclosed. In this embodiment, the movable element 10, transducer drive circuit 20, and the transducer circuit 43 comprised of the transducer 18 and sine to square converter 22 operate in a similar manner as earlier described. However, the frequency detecting circuit 45 is comprised of a phase detector 44, gating network 46, sample pulse generator 60 and phase counter 48. The phase counter is of a well-known design and contains a one-pulse add/delete circuit 50, a gating network 52 and a counter 54. Typically, the modulus of the counter 54 will be the same as the modulus of the reference counter 21 in the transducer drive circuit 20. Therefore, with a zero velocity, the output of the counter 54 will be in phase with the output from the sine to square converter 22.

If the movable element experiences a motion, the output signal from the transducer circuit will change in frequency. The counter 54 follows the transducer circuit output with a shift in phase proportional to the change in frequency of the transducer circuit output. Consequently, the phase detector will produce an error signal, on output line 56, representing the magnitude of the phase shift between the inputs. In addition, the phase detector will produce, on output line 58, a sign signal indicating the direction of the phase shift. The gating network 46 is responsive to the error signal on line 56 and a source of clock pulses for producing a number of error pulses over a predetermined increment of time on line 47, which are proportional to the velocity of the movable element. The predetermined increment of time or sample time is a function of a sampling rate determined by a sample pulse generator 60. A particular sampling rate and the timing of the sampling process is an arbitrary design decision; however, there are important considerations. For example, it would be possible to count the error pulses from the gating network on every cycle of the transducer output; but at slower velocities, the output may only change one increment over a number of such cycles. Consequently, it is often more desirable to provide a sampling rate which produces a reasonable number of error pulses for velocity changes in the lower velocity region. The sample pulse generator 60 produces a sample signal on output line 62 and a reset signal on output line 64. These signals along with the output from the gating network 46, and the sign signal on line 58 are inputs to the converter circuit 66.

In this embodiment the converter circuit 66 is comprised of a digital to analogue converter. The converter typically includes a counter 68, a switching network 70 and a reference voltage source 72. The counter 68 is responsive to the reset signal and the error pulses on lines 64 and 47, respectively. The counter is reset to zero on each reset signal; and during the sampling process, the counter accumulates the error pulses and contains a binary signal representing the phase shift between the transducer circuit output and the phase counter output. The output of each stage of the counter 68 defines a control signal for a switching element in the switching network 70. In response to a sample signal and a control signal from a corresponding counter stage, each switching element energizes a scaled magnitude of the reference voltage. The reference voltage source 72 is responsive to the sign signal from the phase detector 44 to reverse the polarity of the reference voltage as a function of the direction of the velocity. The energized scaled values of the reference voltage are summed together, and a DC output signal representing the velocity of the movable element is produced on output line 74 of the converter circuit 57. The DC output signal can be calibrated to an appropriate value by adjusting the magnitude of the reference voltage from the source 72.

While the invention has been illustrated in some detail, according to the preferred embodiments shown in the accompanying drawings and while the preferred illustrated embodiments have been described in some detail, there is no intention to thus limit the invention to such detail. On the contrary, it is intended to cover all modifications, alterations and equivalents falling within the spirit and scope of appended claims.

What is claimed is:

1. An apparatus for measuring velocity of a movable element, the apparatus comprising:
   a. means for producing a number of input signals having a predetermined phase relationship;
   b. a transducer mechanically coupled to the movable element, said transducer having a number of inputs responsive to the input signals and producing a periodic transducer output signal with frequency variations occurring as a function of a velocity of the movable element;
   c. means responsive to the transducer output signal for producing a control signal synchronized with the beginning of each period of the transducer output signal;
   d. means responsive to the control signal for producing a reference signal having a time duration equal to one-half of the period of the transducer output signal with the movable element at a zero velocity;
   e. means responsive to the transducer output signal and the reference signal for producing a pulse width modulated signal representing the magnitude and direction of the velocity of the movable element; and
   f. means responsive to the pulse width modulated signal for producing a DC output signal representing the magnitude and velocity of the movable element.

2. An apparatus for measuring velocity of a movable element, the apparatus comprising:
   a. means for producing a number of input signals having a predetermined phase relationship;
   b. a transducer mechanically coupled to the movable element, said transducer having a number of inputs responsive to the input signals and producing a periodic transducer output signal with frequency variations occuring as a function of a velocity of the movable element;
   c. means having a first input responsive to the transducer output signal and a second input for detecting the phase difference between the inputs and producing a number of pulses representing the magnitude of the phase difference and a sign signal representing the sense of the phase difference;
   d. means for producing a reference signal being in phase with the transducer output signal at a zero velocity and including means responsive to the number of pulses and the sign signal for incrementally changing the frequency of the reference signal; and
   e. means responsive to the number of pulses and the sign signal for algebraically accumulating said pulses over predetermined periods of time and producing a DC output signal representing the magnitude and direction of the velocity of the movable element.

* * * * *